United States Patent [19]

Gianzero

[11] 4,302,722
[45] Nov. 24, 1981

[54] INDUCTION LOGGING UTILIZING RESISTIVE AND REACTIVE INDUCED SIGNAL COMPONENTS TO DETERMINE CONDUCTIVITY AND COEFFICIENT OF ANISOTROPY

[75] Inventor: Stanley Gianzero, Ridgefield, Conn.

[73] Assignee: Schlumberger Technology Corporation, New York, N.Y.

[21] Appl. No.: 48,876

[22] Filed: Jun. 15, 1979

[51] Int. Cl.³ ............................................. G01V 3/28
[52] U.S. Cl. ................................................... 324/339
[58] Field of Search ................ 324/338, 339, 343, 346

[56] References Cited

U.S. PATENT DOCUMENTS

| | | | |
|---|---|---|---|
| 2,401,280 | 5/1946 | Walstrom | 324/346 |
| 2,716,730 | 8/1955 | Williams | 324/346 |
| 3,014,177 | 12/1961 | Hungerford et al. | 324/339 X |
| 3,187,252 | 6/1965 | Hungerford | 324/343 |
| 3,510,757 | 5/1970 | Huston | 324/343 |
| 3,561,007 | 2/1971 | Gouilloud et al. | 324/346 X |
| 3,609,521 | 9/1971 | Desbrandes | 324/343 |
| 3,706,025 | 12/1972 | Regat | 324/339 |
| 3,808,520 | 4/1974 | Runge | 324/343 |

FOREIGN PATENT DOCUMENTS

| | | | |
|---|---|---|---|
| 936461 | 9/1963 | United Kingdom . | |
| 648928 | 2/1979 | U.S.S.R. | 324/343 |

*Primary Examiner*—Gerard R. Strecker
*Attorney, Agent, or Firm*—Kenneth Olsen; David Carroll; Martin Novack

[57] ABSTRACT

The invention is directed to induction logging apparatus and method for obtaining measurements dependent upon the vertical conductivity component of formations surrounding a borehole. The disclosed techniques can also be used to determine horizontal as well as vertical conductivity of the formations, and thereby achieve determination of formation anisotropy. A transmitter coil is provided with its axis substantially perpendicular to the borehole axis. A receiver coil is provided in spaced relation to the transmitter coil. The axis of the receiver coil is also substantially perpendicular to the borehole axis, and is preferably parallel to the axis of the transmitter coil. Means are provided for detecting signals induced in the receiver coil, these signals being a measure of the formation vertical conductivity. In a preferred embodiment of the invention, the detecting means is operative to detect both the resistive and reactive components of the signals induced in the receiver coils. Indications of formation vertical conductivity are obtained by combining the detected resistive and reactive components. In a further form of the invention, the formation horizontal conductivity can also be obtained from the detected resistive and reactive components. Alternatively, horizontal conductivity may be determined using a pair of spaced coils having a common axis aligned with the borehole axis.

27 Claims, 6 Drawing Figures

INDUCTION LOGGING UTILIZING RESISTIVE AND REACTIVE INDUCED SIGNAL COMPONENTS TO DETERMINE CONDUCTIVITY AND COEFFICIENT OF ANISOTROPY

BACKGROUND OF THE INVENTION

This invention relates to induction logging techniques and, more particularly, to induction logging apparatus and method for obtaining measurements dependent upon the vertical conductivity component of formations surrounding a borehole.

Conventional induction well logging techniques employ coils wound on an insulating mandrel. One or more transmitter coils are energized by an alternating current. The oscillating magnetic field produced by this arrangement results in the induction of currents in the formations which are nearly proportional to the conductivity of the formations. These currents, in turn, contribute to the voltage induced in one or more receiver coils. By selecting only the voltage component which is in phase with the transmitter current, a signal is obtained that is approximately proportional to the formation conductivity. In conventional induction logging apparatus, the basic transmitter coil and receiver coil has axes which are aligned with the longitudinal axis of the well logging device. (For simplicity of explanation, it will be assumed that the borehole axis is aligned with the axis of the logging device, and that these are both in the vertical direction. Also single coils will subsequently be referred to without regard for focusing coils or the like.) This arrangement tends to induce secondary current loops in the formations which are concentric with the vertically oriented transmitting and receiving coils. The resultant conductivity measurements are indicative of the horizontal conductivity (or resistivity) of the surrounding formations. There are, however, various formations encountered in well logging which have a conductivity that is anisotropic. Anisotropy results from the manner in which formation beds were deposited by nature. For example, "uniaxial anisotropy" is characterized by a difference between the horizontal conductivity, $\sigma_H$, in a plane parallel to the bedding plane, and the vertical conductivity, $\sigma_V$, in a direction perpendicular to the bedding plane. When there is no bedding dip, $\sigma_H$ can be considered to be in the plane perpendicular to the borehole, and $\sigma_V$ in the direction parallel to the borehole. The coefficient of anisotropy, designated $\gamma$, is defined by $$\lambda = \sqrt{\frac{\sigma_H}{\sigma_V}} \tag{1}$$

Conventional induction logging devices, which tend to be sensitive only to the horizontal conductivity of the formations, do not provide a measure of vertical conductivity or of anisotropy.

There have been proposed in the prior art so-called "induction dipmeter" devices for measuring formation dip and/or anisotropy parameters. For example, in the U.S. Pat. No. 3,808,520, a vertical transmitter coil is used in conjunction with three receiver coils having mutually orthogonal axes; i.e., one vertical and two mutually orthogonal horizontal coils. The outputs of the three receiver coils are utilized in specified relationships to obtain combined dip and anisotropy information. According to the technique of this patent, anisotropy can be obtained if one has a knowledge of formation dip from another device, such as a conventional dipmeter device. In the U.S. Pat. No. 3,510,757, vertical transmitter coils are used in conjunction with a pair of orthogonal horizontal receiver coils, and the outputs of the receiver coils are recorded and utilized to obtain indications of formation dip. A type of prior art induction dipmeter has also been disclosed wherein a coil array is mechanically rotated at a constant frequency to produce modulation components in receiver coil signals at the frequency of rotation of the coil array. These modulation components are processed to obtain indications of dip and/or dip azimuth of formation bedding planes. See, for example, U.S. Pat. Nos. 3,014,177, 3,187,252 and 3,561,007. It is generally recognized that a disadvantage of a rotating type of induction dipmeter is the requirement for bulky and power consuming equipment for rotating coils and keeping track of their orientation.

Another typical situation where formations have conductivity characteristics that may be difficult to interpret is when heterogeneities exist. An example of a formation heterogeneity is when borehole fluids invade the formations to form a so-called invaded zone which has a different conductivity than the uninvaded formations. Another example is where a fracture in the formations is filled with a conductive fluid. In the U.S. Pat. No. 3,706,025, there is disclosed a technique whereby the resistive and reactive components of an induction logging device can be combined in a specified manner to obtain a complex conductivity which provides quantitative indication of the degree to which the formation is heterogeneous.

It is among the objects of the present invention to provide a technique for measuring the vertical conductivity of formations surrounding a borehole.

SUMMARY OF THE INVENTION

The present invention is directed to induction logging apparatus and method for obtaining measurements dependent upon the vertical conductivity component of formations surrounding a borehole. The techniques of this invention can also be used to determine horizontal as well as vertical conductivity of the formations, and thereby achieve determination of formation anisotropy.

In accordance with an embodiment of the apparatus of the invention, a transmitter coil is provided with its axis substantially perpendicular to the borehole axis. A receiver coil is provided in spaced relation to the transmitter coil. The axis of the receiver coil is also substantially perpendicular to the borehole axis, and is preferably parallel to the axis of the transmitter coil. Means are provided for detecting signals induced in the receiver coil, these signals being a measure of the formation vertical conductivity.

In the preferred embodiment of the invention, the detecting means is operative to detect both the resistive and reactive components of the signals induced in the receiver coils. Indications of formation vertical conductivity are obtained by combining the detected resistive and reactive components. In a further form of the invention, the formation horizontal conductivity can also be obtained from the detected resistive and reactive components. Alternatively, horizontal conductivity may be determined using a pair of spaced coils having a common axis aligned with the borehole axis.

Further features and advantages of the invention will become more readily apparent from the following detailed description when taken in conjunction with the accompanying drawings.

DESCRIPTION OF THE PREFERRED EMBODIMENT

Figure 1:
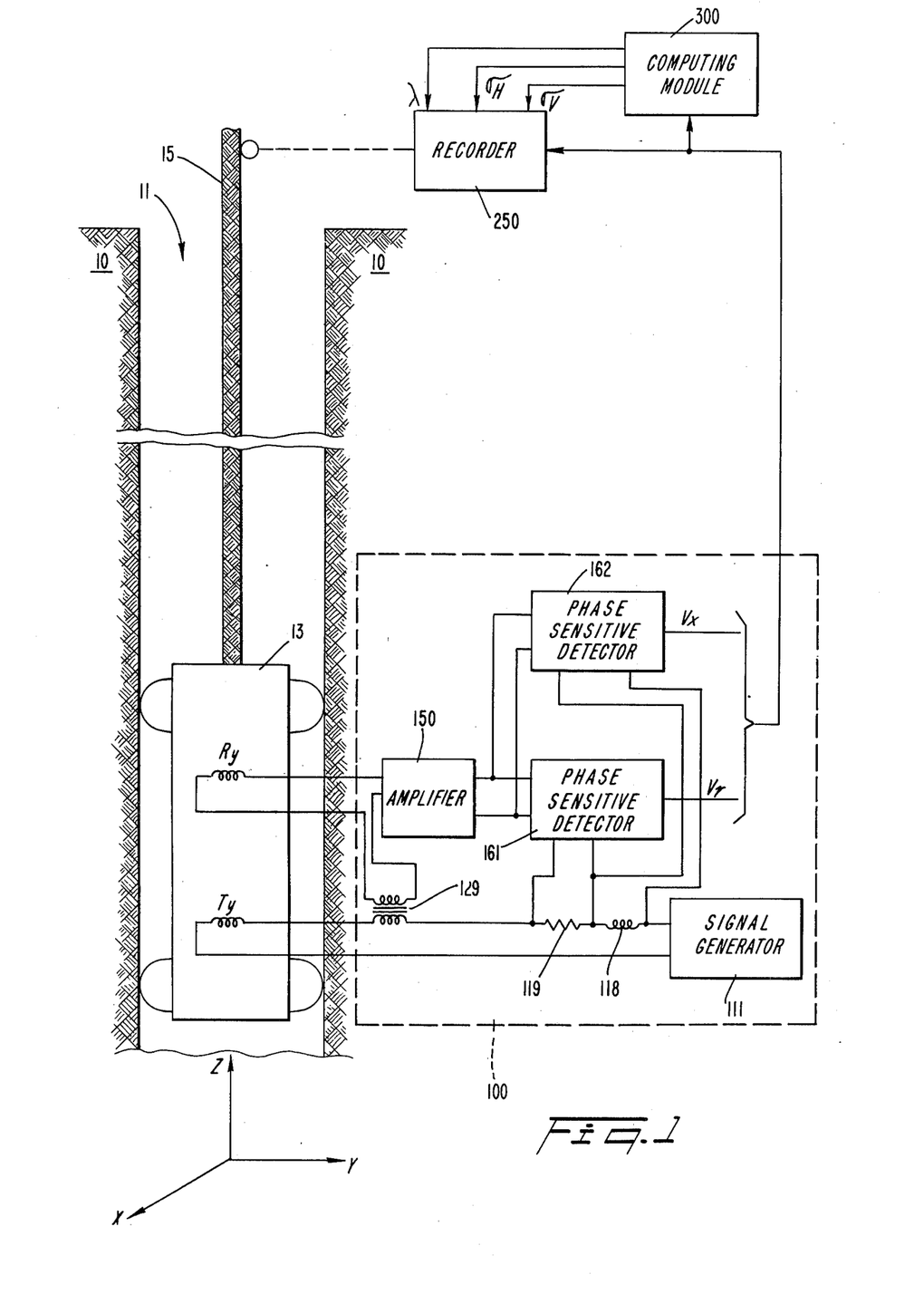
FIG. 1 illustrates an embodiment of the invention in a borehole, along with a schematic representation, partially in block form, of the coil system and associated circuitry.

Referring to FIG. 1, there is shown a representative embodiment of an induction logging apparatus in accordance with the present invention for investigating earth formations 10 traversed by a borehole 11. The downhole device of the logging apparatus includes coils mounted on a centralized support member 13 adapted for movement through the borehole 11. The downhole device also includes a fluid-tight enclosure which contains electronic circuitry, this circuitry being shown in block diagram form in dashed enclosure 100 at the side of the borehole. The downhole device is suspended from the surface of the earth by an armored multiconductor cable 15. A suitable drum and winch mechanism (not shown) is located at the surface of the earth for raising and lowering the device through the borehole. Also located at the surface of the earth may be a power supply (not shown) for supplying electrical energy by way of the cable 15 to the downhole equipment.

The downhole device of this embodiment includes a transmitter coil designated $T_y$, and a receiver coil designated $R_y$. Both coils are mounted in a mechanically passive manner on support member 13. The coils are parallel to each other and have axes which are oriented perpendicular to the borehole axis; i.e., in the y direction in FIG. 1. The transmitter $T_y$ is energized by a signal generator 111 which is coupled to the transmitter coil $T_y$ via an inductor 118, a resistor 119, and the primary winding of a transformer 129.

The receiver coil $R_y$ is coupled to an amplifier 150 via the secondary winding of transformer 129. The output of amplifier 150 is coupled to phase sensitive detectors 161 and 162. The phase sensitive detector 161 receives a reference phase signal from across a resistor 119 which is phase with the current in the transmitter coil. The phase sensitive detector 162 receives as a reference phase signal the signal developed across an inductor 118, this signal being in phase quadrature with the current in the transmitter coil. Using these phase reference signals, the phase sensitive detectors 161 and 162 respectively generate output signals which are proportional to the in-phase or "resistive" component of the induced receiver signal and the phase quadrature or "reactive" component of the induced receiver signal. The outputs of phase sensitive detectors 161 and 162 are respectively designated $V_r$ and $V_x$.

In operation, the signal generator 111 energizes the transmitter coil $T_y$ at a constant frequency. Secondary currents are induced in the adjacent formation material and these, in turn, result in voltages being induced in the receiver $R_y$. Also induced in the receiver coil is a so-called "mutual" voltage component caused by direct flux coupling between the transmitter and receiver coils. As is well known, this mutual component can be cancelled using the transformer 129 of FIG. 1, or can be effectively cancelled by other known electrical and/or numerical processing means. The signals representative of $V_r$ and $V_x$ are transmitted to the earth's surface via cable 15. At the earth's surface, the signals transmitted from downhole are recorded by recorder 250 as a function of borehole depth. The recorder is conventionally provided with means (not shown) synchronized with the length of cable 15 and, accordingly, with the depth of the downhole logging device. The downhole signals are also coupled to a computing module 300 which generates outputs that are also recordable on recorder 250. In the present embodiment the computing module 300 generates outputs representative of the vertical conductivity ($\sigma_V$), the horizontal conductivity ($\sigma_H$), and the anisotropy ($\lambda$) of the formations.

To better understand the theory underlying the invention, consider a simplified model wherein a pair of horizontal magnetic dipoles are spaced apart by a distance L in a medium. The medium is assumed to be homogeneous with uniaxial anisotropy; i.e., with a vertical conductivity designated $\sigma_V$ in the direction of the borehole axis (the z axis), and a horizontal conductivity, designated $\sigma_H$, in the plane perpendicular to the borehole axis (the xy plane). Using this model, one can express the complex voltage, $V^*$, induced at whichever dipole is considered the receiver, as:

$$V^* = V_r + jV_x = \qquad (2)$$
$$C_I\left\{\frac{\sigma_H}{(L/\delta_H)^2}\left[\left(\frac{L}{\delta_H}\right)+1\right]\left[\left(\frac{L}{\delta_H}\right)+j\right]e^{(j-1)\frac{L}{\delta_H}} + \sigma_v e^{(j-1)\frac{L}{\delta_H}} - j\frac{\sigma_H}{(L/\delta_H)^2}\right\}$$

where $\delta_H$ is the horizontal skin depth defined by $$\delta_H = \sqrt{\frac{2}{\omega \sigma_H \mu_o}} \qquad (3)$$

$\omega$ is the radian frequency at the transmitter, $\mu_o$ is the magnetic permeability of free space, and $C_I$ is an instrument coefficient which depends upon the electrical and mechanical properties of the coil system.

The expression for $V^*$ has included therein a term (i.e., the last term) which expresses the subtraction of the mutual coupling between transmitter and receiver, and it will be understood that this mutual coupling can be removed by means such as transformer 129 in FIG. 1 or by implementing other appropriate electrical or numerical correction. The complex conductivity, $\sigma^*$, of the simplified model is proportional to the complex voltage, $V^*$, and can be expressed by dividing $V^*$ by an instrument coefficient, $C_I$, so we have:

$$\sigma^* = \sigma_r + j\sigma_x = \frac{V^*}{C_I} = \frac{V_r}{C_I} + j\frac{V_x}{C_I} \quad (4)$$

Figure 2:
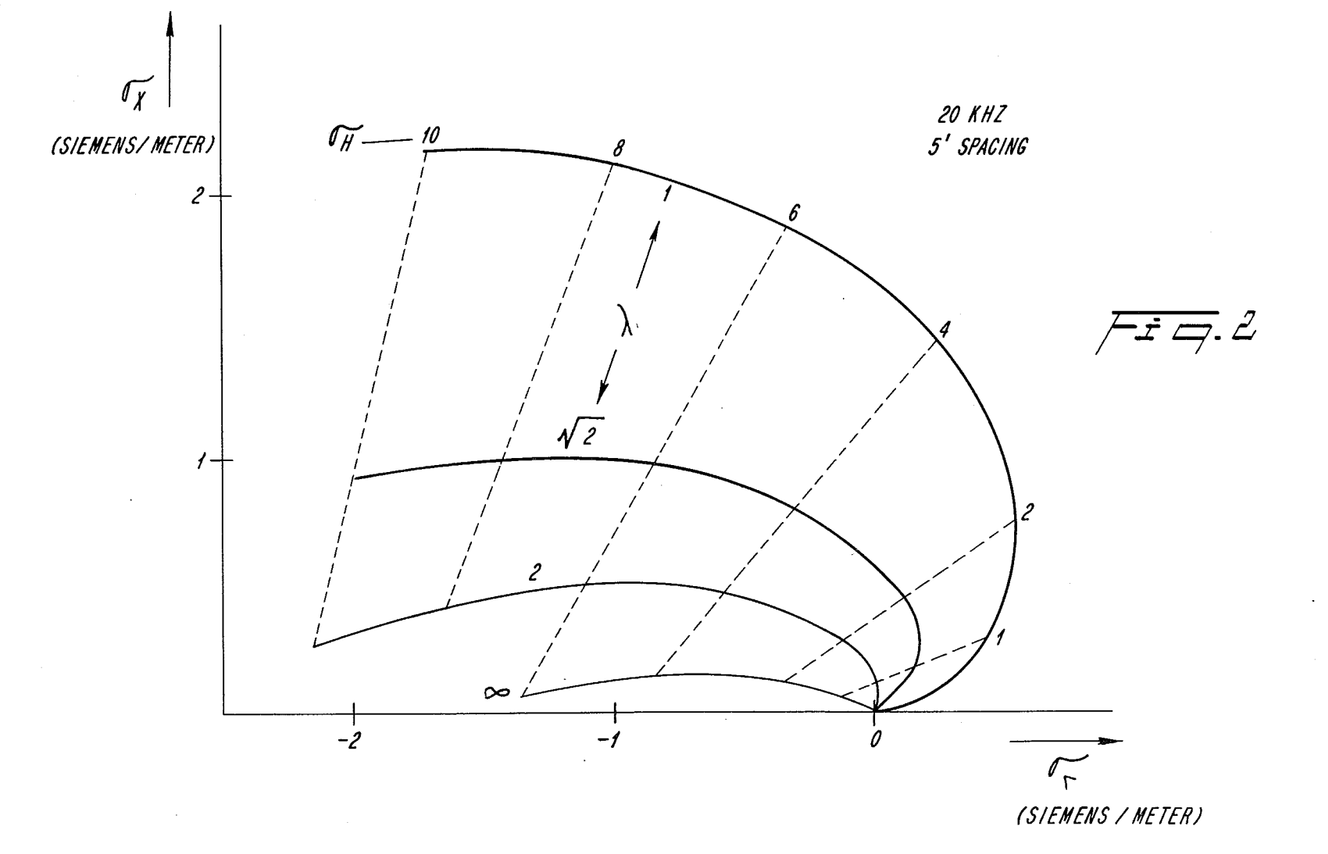
FIG. 2 shows a conductivity cross-plot used in conjunction with the invention.

The values of $\sigma_V$ and $\sigma_H$ can be selected to satisfy relationship (2) for particular values of $\sigma_r$ and $\sigma_x$ (which, in turn, are proportional to $V_r$ and $V_x$ in accordance with relationship (4)). The desired values of $\sigma_V$ and $\sigma_H$ can be obtained graphically or obtained automatically via computer table look-up, curve-matching, or iterative solution of relationship (2). Graphical solution is illustrated in FIG. 2 which shows a cross-plot of $\sigma_r$ versus $\sigma_x$ for different values of $\sigma_V$ and $\sigma_H$ with L equals 5 feet and a frequency of 20 KHz. Actually, $\sigma_V$ comes into play in FIG. 2 in the form of the anisotropy parameter, $\lambda$, which is defined by $$\lambda = \sqrt{\frac{\sigma_H}{\sigma_V}} \quad (5)$$

as was set forth above in relationship (1). The graph of FIG. 2 can be obtained, for example, by selecting the values of $\sigma_H$ and $\sigma_V$ (or $\lambda$) and inserting them into relationship (2) to obtain values of $\sigma_r$ and $\sigma_x$. Later, during operation, the curves can be used in conjunction with measured values of $\sigma_r$ and $\sigma_x$ (actually, $V_r$ and $V_x$-see relationship (4) above) to obtain apparent values of $\sigma_V$ and $\sigma_H$.

Figure 3:
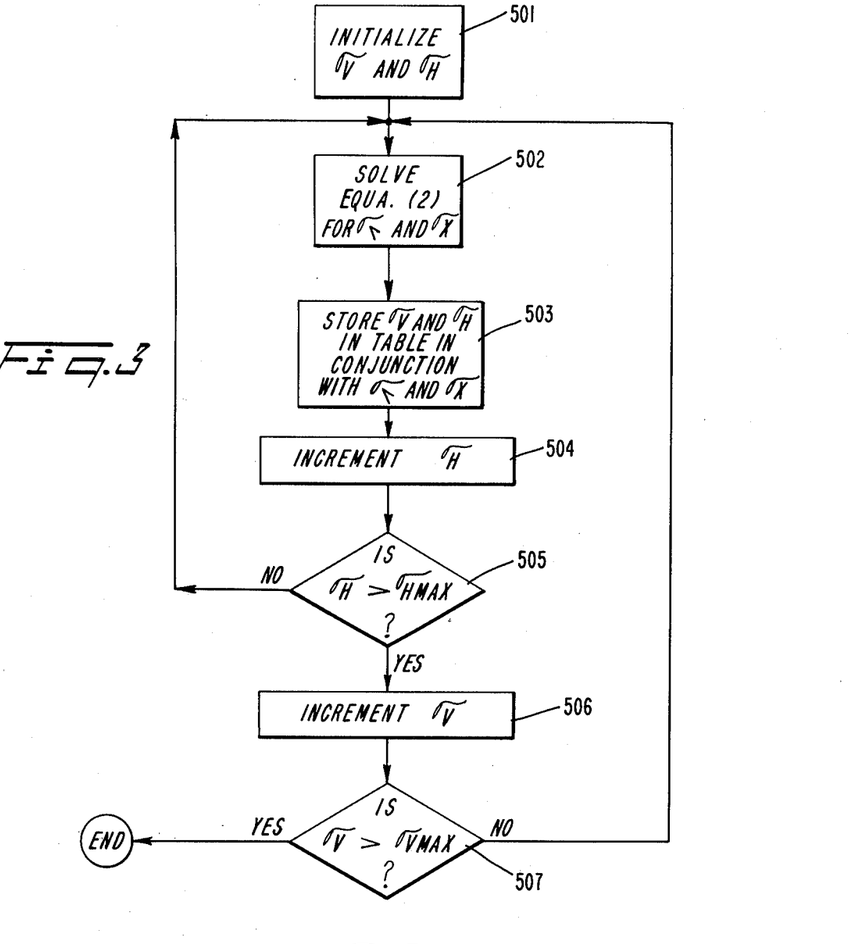
FIG. 3 is a flow diagram useful in implementing a table look-up scheme which can be utilized in conjunction with the invention.

A procedure similar to that just described for forming and using the graph of FIG. 2 can be implemented in the form of an automatic table look-up scheme incorporated in the computing module 300 of FIG. 1. The computing module may comprise, for example, any suitable small general purpose digital computer. A simplified flow chart for programming the computing module 300 to store the table of values is shown in FIG. 3. Initial values of $\sigma_V$ and $\sigma_H$ are first selected, as indicated by the block 501. These values could typically be the lowest possible expected values of $\sigma_V$ and $\sigma_H$. Block 502 is then entered and represents the function of solving for $\sigma_r$ and $\sigma_x$ using relationship (2). The current values of $\sigma_V$ and $\sigma_H$ are then stored in conjunction with the calculated values of $\sigma_r$ and $\sigma_x$, as represented by the block 503. The value of $\sigma_H$ is then incremented, as represented by the block 504. $\sigma_H$ is then tested (diamond 505) to determine if it exceeds the maximum value of $\sigma_H$ to be used, designated $\sigma_{HMAX}$. If not, block 502 is reentered, and new values are stored in the table. When $\sigma_H$ has been incremented over its full range, the answer to the inquiry of diamond 505 will be "yes" and block 506 is entered, this block representing the incrementing of $\sigma_V$. $\sigma_V$ is then tested (diamond 507) to determine if it exceeds the maximum value of $\sigma_V$ to be utilized, designated $\sigma_{VMAX}$. If not, block 502 is again entered and, as previously described, a new set of values will be determined as $\sigma_H$ is iterated over its full range for this new value of $\sigma_V$. This procedure will continue until $\sigma_V$ exceeds its maximum value, $\sigma_{VMAX}$, whereupon the routine is over and the full table of values has been stored. During operation, values of $\sigma_r$ and $\sigma_x$ derived from measurements are entered into computing module 300 which finds the closest match $\sigma_V$, $\sigma_H$ from the stored table. These values are recorded on recorder 250.

Figure 4:
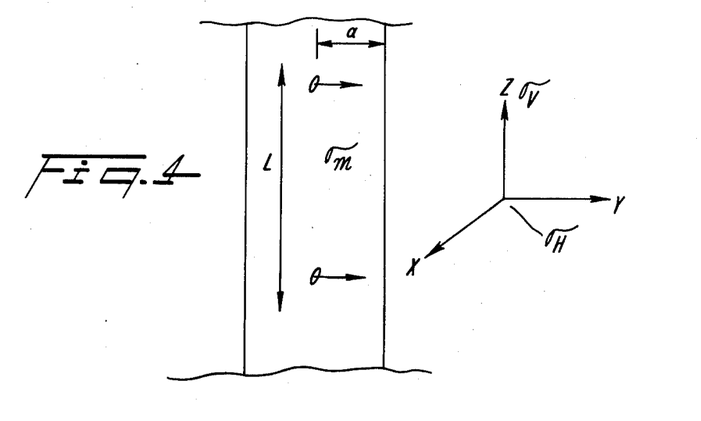
FIG. 4 illustrates a simplified model used to obtain computed data.

To illustrate possible performance of the technique just described, consider the simplified model of FIG. 4, wherein a pair of horizontal magnetic dipoles are again shown as being spaced apart by a distance L. In this model, however, the magnetic dipoles are assumed to be disposed in a borehole of radius a filled with a mud of conductivity $\sigma_m$. The formation medium surrounding the borehole is again assumed to be homogeneous with uniaxial anisotropy; i.e., with a vertical conductivity $\sigma_V$ in the direction of the borehole axis, and a horizontal conductivity $\sigma_H$ in the plane perpendicular to the borehole axis. Using this model, one can express the complex conductivity as follows:

$$\sigma^* = \sigma_r + j\sigma_x = \quad (6)$$

$$\sigma_m \left\{ \frac{\frac{L}{\delta_m}\left[2\frac{L}{\delta_m}+1\right] + j\left[\frac{L}{\delta_m}+1\right]}{(L/\delta_m)^2} \right\} e^{(j-1)L/\delta_m} -$$

$$\frac{2}{\pi}\sigma_m\left(\frac{L}{a}\right)\int_0^\infty d\xi \cos\xi\left(\frac{L}{a}\right)\left[\frac{\xi^2}{2j(a/\delta_m)^2}\Gamma_2(\xi) + \Gamma_1(\xi)\right] -$$

$$j\frac{\sigma_H}{(L/\delta_H)^2}$$

where $\xi$ is an integration variable, $\Gamma_2(\xi)$ and $\Gamma_1(\xi)$ are complex reflection coefficients which are functions of $\sigma_V$ and $\sigma_H$ and where $$\delta_m = \sqrt{\frac{2}{\omega\sigma_m\mu_o}} \quad (7)$$

Table I was generated using the selected values of borehole radii a, $\sigma_m$, $\sigma_H$, and $\sigma_V$.

TABLE I

| $\sigma_V$ | $\sigma_H$ | a | $\sigma_m$ | $\sigma_r$ | $\sigma_x$ | $\sigma_{VA}$ | $\sigma_{HA}$ |
|---|---|---|---|---|---|---|---|
| 1000 | 1000 | ∞ | 1000 | 462 | 338 | 1000.7 | 1000.2 |
| 500 | 1000 | 4" | 1000 | 167 | 202 | 500.4 | 996.3 |
| 250 | 1000 | 4" | 1000 | 18 | 134 | 249.1 | 995.9 |
| 500 | 1000 | 6" | 1000 | 168 | 202 | 501.2 | 994.3 |
| 250 | 1000 | 6" | 1000 | 19 | 134 | 249.9 | 993.6 |

The procedure was as follows: Using as inputs the selected values of a, $\sigma_m$, $\sigma_H$ and $\sigma_V$, equation (6) was utilized to obtain values of $\sigma_r$ and $\sigma_x$ for the model of FIG. 4. Then, using the computed $\sigma_r$ and $\sigma_x$ as simulated "data" the curves of FIG. 2 were used to obtain "apparent" values of vertical and horizontal conductivity listed in the table as $\sigma_{VA}$ and $\sigma_{HA}$, respectively. Comparison $\sigma_{VA}$ and $\sigma_{HA}$ with $\sigma_V$ and $\sigma_H$, respectively, indicate that they agree well with the original assumed values.

Figure 5:
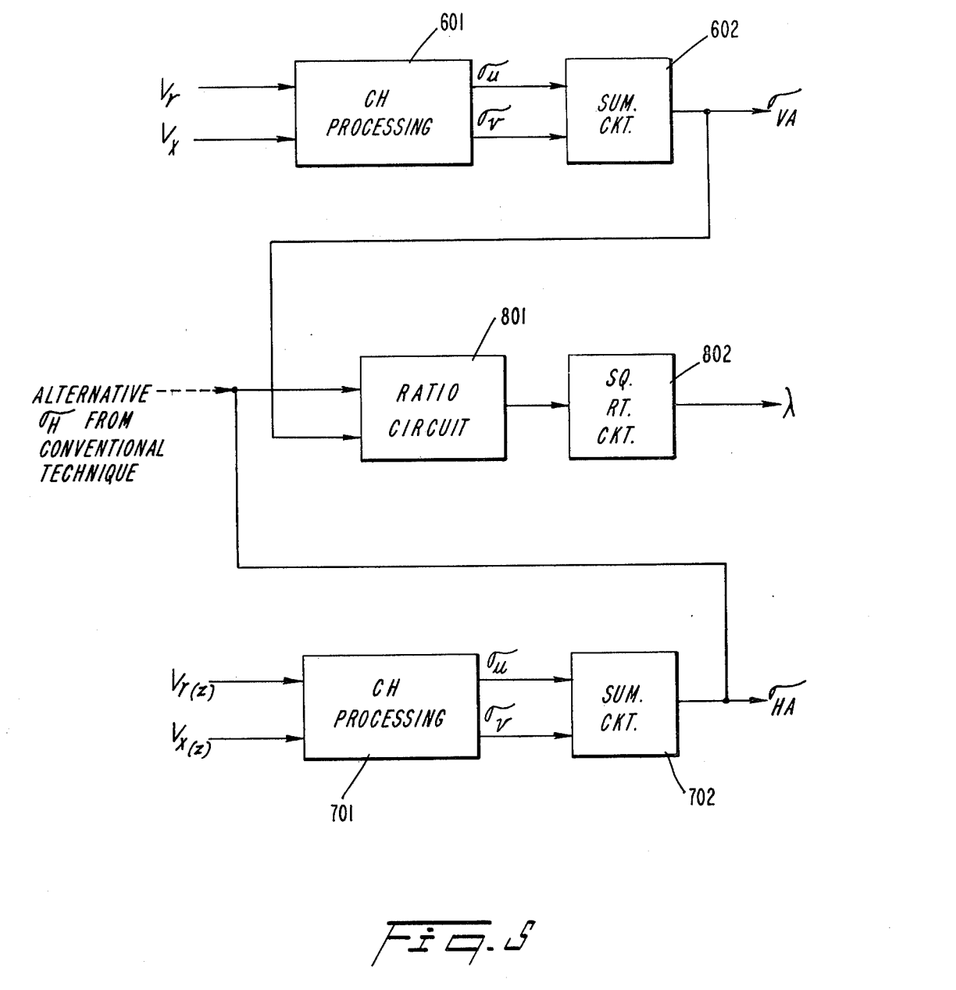
FIG. 5 is a block diagram for practising a further form of the invention.

A further technique for obtaining apparent vertical conductivity from the measurements of FIG. 1 will next be described. Applicant has found that if the values of $\sigma_r$ and $\sigma_x$ obtainable from the horizontally oriented coils of FIG. 1 are subjected to conductivity/-heterogeneity ("CH") processing, as described in the U.S. Pat. No. 3,706,025, the resultant values of average conductivity ($\sigma_u$) and heterogeneity ($\sigma_v$) can be simply superimposed to obtain $\sigma_{VA}$. This procedure is shown in block form at the top of FIG. 5. The block 601 represents the CH processing of $V_r$ and $V_x$ (which are proportional to $\sigma_r$ and $\sigma_x$ to obtain the processed values of $\sigma_u$ and $\sigma_v$ in accordance with the teachings of U.S. Pat. No. 3,706,025, which are incorporated herein by reference. The resultant values of $\sigma_u$ and $\sigma_v$ are added by summing circuit 602 to obtain an output value of $\sigma_{VA}$ which can be recorded by recorder 250 of FIG. 1. It should be noted that the CH type of processing performed by block 601 differs from that of the U.S. Pat. No. 3,706,025 in that the values of $\sigma_u$ and $\sigma_v$ are obtained from an expression for horizontal magnetic dipoles (corresponding to the coil arrangement of FIG. 1) whereas, in the referenced patent, the equation used as a basis for processing was based on an equation for vertical magnetic dipoles representative of coil orientation in a conventional induction logging array. In particular, the expression for apparent complex conductivity as between spaced horizontal magnetic dipoles in a homogeneous isotropic medium of conductivity $\sigma$ is as follows:

$$\sigma^* = \sigma_r + j\sigma_x = \left\{ \frac{\sigma \frac{L}{\delta}\left[2\left(\frac{L}{\delta}\right)+1\right]+\left[j\left(\frac{L}{\delta}\right)+1\right]}{(L/\delta)^2} \right\} e^{(j-1)L/\delta} - j\frac{\sigma}{(L/\delta)^2} \quad (8)$$

where $$\delta = \sqrt{\frac{2}{\omega\sigma\mu_o}} \quad (9)$$

To illustrate possible performance of this technique, results are tabulated in Table II, with the "data" having again been obtained from the model of FIG. 4, referred to above.

TABLE II

| $\sigma_V$ | $\sigma_H$ | a | $\sigma_m$ | $\sigma_r$ | $\sigma_x$ | $\sigma_u$ | $\sigma_v$ | $\sigma_{VA}$ |
|---|---|---|---|---|---|---|---|---|
| 1000 | 1000 | ∞ | 1000 | 462 | 338 | 1000 | 0 | 1000 |
| 500 | 1000 | 4" | 1000 | 167 | 202 | 345 | 245 | 590 |
| 250 | 1000 | 4" | 1000 | 18 | 134 | 33 | 193 | 226 |
| 500 | 1000 | 6" | 1000 | 168 | 202 | 348 | 244 | 592 |
| 250 | 1000 | 6" | 1000 | 19 | 134 | 35 | 193 | 228 |

In this case, however, the "data" values of $\sigma_r$ and $\sigma_x$ were "CH" processed to obtain values of $\sigma_u$ and $\sigma_v$. $\sigma_u$ and $\sigma_v$ were then added to obtain an apparent value of vertical conductivity, $\sigma_{VA}$, which is seen to reasonably correspond with the original assumed value of $\sigma_V$.

Figure 6:
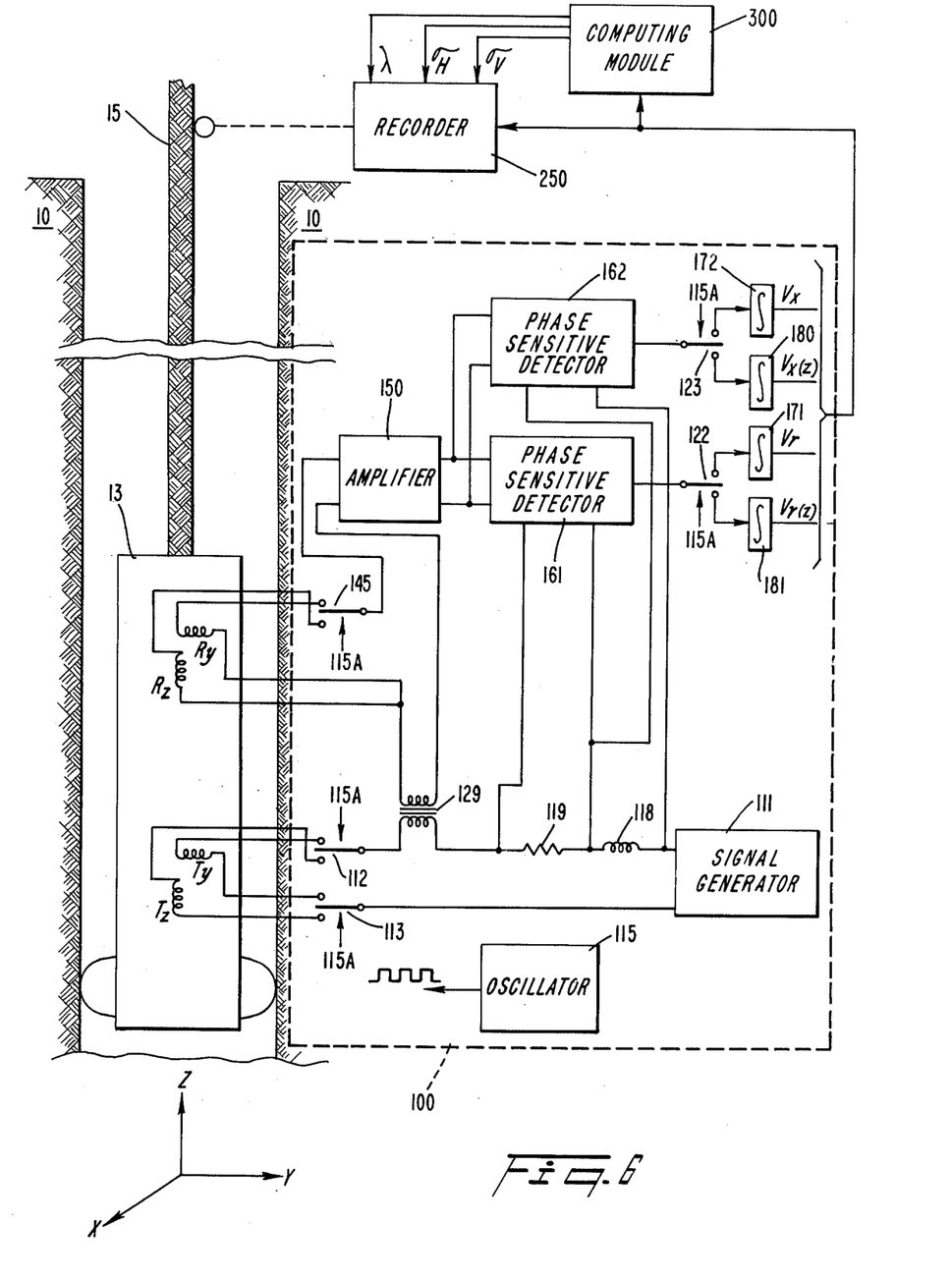
FIG. 6 illustrates another embodiment of the invention in a borehole, along with a schematic representation, partially in block form, of another coil system and associated circuitry.

Referring to FIG. 6, there is shown a further embodiment of the invention wherein the downhole device 13 (see FIG. 1) is modified to include an additional pair of coils designated $T_z$ and $R_z$ which are aligned with the borehole axis; i.e., the z direction of FIG. 1. In the embodiment of FIG. 6, the transmitters $T_y$ and $T_z$ are alternately operated, although it will be understood that other techniques such as frequency division could be used to separate operation of the vertical and horizontal coil pairs. In the FIG. 6 arrangement, voltage controlled switches 112 and 113 respectively couple the energizing source to the transmitter coils. The switches 112 and 113 are controlled by the square wave output 115A of an oscillator 115, and are operative to alternately couple energy from generator 111 to the coils $T_z$ and $T_y$, depending on the polarity of the square wave. Also, in the FIG. 6 embodiment, the receiver coils $R_z$ and $R_y$ are coupled to amplifier 150 via voltage controlled switch 145. The phase sensitive detectors 161 and 162 operate in the same manner as in FIG. 1, but in this embodiment their outputs are respectively coupled to voltage controlled switches 122 and 123. The switches 145, 122 and 123 are under control of square wave 115A, and are therefore under common control with the switches 112 and 113. One branch of switch 123 is coupled to integrator 172 and the other branch thereof is coupled to integrator 182. Also, one branch of switch 122 is coupled to integrator 171 and the other branch thereof is coupled to integrator 181. The integrators serve as averaging circuits which provide a smooth output notwithstanding the 50% duty cycle of their inputs. The outputs of integrators 171 and 172 are respectively designated $V_r$ and $V_x$, and correspond to the outputs obtained from $R_y$ in FIG. 1. The outputs of integrators 181 and 182, obtained from receiver coil $R_z$ are respectively designated $V_{r(z)}$ and $V_{x(z)}$, and are the real and imaginary components of the voltage induced across $R_z$. In operation, it can be readily seen that the switches 145, 122 and 123 operate in synchronism with the switches 112 and 113. Accordingly, when the switching control signal 115A is one polarity (for example, positive) transmitter coil $T_y$ is energized and the outputs of phase sensitive detectors 161 and 162 are respectively coupled to integrators 171 and 172. This results in the integrators 171 and 172 generating outputs which respectively represent the resistive and reactive components of the voltage induced across receiver coil $R_y$ when transmitter coil $T_y$ is energized. Similarly, when the square wave 115A is at its other polarity (for example, negative), transmitter coil $T_z$ is energized and the outputs of phase sensitive detectors 161 and 162 are respectively coupled to integrators 181 and 182. This results in integrators 181 and 182 generating outputs which respectively represent the resistive and reactive components of the voltage across receiver coil $R_z$ when transmitter coil $T_z$ is energized.

In the embodiment of FIG. 6, the signals induced in the horizontal receiver coil $R_y$ are recorded and also processed in computing module 300 in the manner already set forth. Signals induced in the vertical receiver coil $R_z$ may be processed in a conventional manner to obtain a measure of formation horizontal conductivity, $\sigma_H$, and recorded. However, as illustrated in the lower part of the block diagram of FIG. 5, which illustrates the computing module for this embodiment, the resistive and reactive components of the signals induced in receiver $R_z$ may be CH processed to obtain values of $\sigma_u$ and $\sigma_v$ (block 701). As above, these signals are added, but in this case $\sigma_{HA}$ is obtained. Outputs representative of $\sigma_{VA}$ and $\sigma_{HA}$ are recorded and also coupled to ratio circuit 801 whose output is, in turn, coupled to circuit 802 which has a square root characteristic. The output of circuit 802 is the signal proportional to λ in accordance with relationship (5).

The invention has been described with reference to particular preferred embodiments, but variations within the spirit and scope of the invention will occur to those skilled in the art. For example, while processing of the derived downhole signals is shown as being implemented at the well bore site, processing of these signals may alternatively be performed at a remote location.

I claim:

1. Apparatus for determining the vertical conductivity of formations surrounding a borehole, comprising:
   a transmitter coil having an axis substantially perpendicular to the borehole axis;
   a receiver coil spaced from said transmitter coil and having an axis which is substantially parallel to the axis of said transmitter coil;
   means for energizing said transmitter coil;

means for detecting the resistive and reactive components of the signals induced in said receiver coil; and means responsive to the detected components for obtaining a measure of the vertical conductivity of said formations.

2. Apparatus as defined in claim 1 wherein said means for obtaining a measure of vertical conductivity comprises means for combining said resistive and reactive components.

3. Apparatus as defined in claim 1 wherein said transmitter coil and receiver coil are mounted in a mechanically passive manner on a support member.

4. Apparatus as defined by claim 2 wherein said transmitter coil and receiver coil are mounted in a mechanically passive manner on a support member.

5. Apparatus as defined by claim 1 further comprising:
a second transmitter coil having an axis substantially parallel to the borehole axis;
a second receiver coil spaced from said second transmitter coil and having an axis substantially parallel to the borehole axis;
means for energizing said second transmitter coil; and
means for detecting signals induced in said second receiver coil as a result of energizing said second transmitter coil, said signal induced in said second receiver coil being a measure of the formation horizontal conductivity.

6. Apparatus as defined by claim 2 further comprising:
a second transmitter coil having an axis substantially parallel to the borehole axis;
a second receiver coil spaced from said second transmitter coil and having an axis substantially parallel to the borehole axis;
means for energizing said second transmitter coil; and
means for detecting signals induced in said second receiver coil as a result of energizing said second transmitter coil, said signal induced in said second receiver coil being a measure of the formation horizontal conductivity.

7. Apparatus as defined by claim 5 wherein said energizing means is adapted to energize said transmitter coils in alternating fashion.

8. Apparatus as defined by claim 6 wherein said energizing means is adapted to energize said transmitter coils in alternating fashion.

9. Apparatus as defined by claim 6 further comprising means responsive to said means for detecting signals induced in said receiver coil and said second receiver coil for determining the formation anisotropy.

10. Apparatus for determining the coefficient of anisotropy of formations surrounding a borehole, comprising:
a transmitter coil having an axis substantially perpendicular to the borehole axis;
a receiver coil spaced from said transmitter coil and having an axis which is substantially parallel to the axis of said transmitter coil;
means for energizing said transmitter coil;
means for detecting the resistive and reactive components of the signals induced in said receiver coil; and
means responsive to the detected components for obtaining a measure of the coefficient of anisotropy of said formations.

11. Apparatus as defined by claim 10 wherein said means for obtaining a measure of the coefficient of anisotropy comprises means for combining said resistive and reactive components.

12. Apparatus as defined by claim 10 wherein said transmitter coil and receiver coil are mounted in a mechanically passive manner on a support member.

13. Apparatus as defined by claim 11 wherein said transmitter coil and receiver coil are mounted in a mechanically passive manner on a support member.

14. Apparatus as defined by claim 10 further comprising:
a second transmitter coil having an axis substantially parallel to the borehole axis;
a second receiver coil spaced from said second transmitter coil and having an axis substantially parallel to the borehole axis;
means for energizing said second transmitter coil; and
means for detecting signals induced in said second receiver coil as a result of energizing said second transmitter coil, said signal induced in said second receiver coil being a measure of the formation horizontal conductivity.

15. Apparatus as defined by claim 11 further comprising:
a second transmitter coil having an axis substantially parallel to the borehole axis;
a second receiver coil spaced from said second transmitter coil and having an axis substantially parallel to the borehole axis;
means for energizing said second transmitter coil; and
means for detecting signals induced in said second receiver coil as a result of energizing said second transmitter coil, said signal induced in said second receiver coil being a measure of the formation horizontal conductivity.

16. Apparatus as defined by claim 14 wherein said energizing means is adapted to energize said transmitter coils in alternating fashion.

17. Apparatus as defined by claim 15 wherein said energizing means is adapted to energize said transmitter coils in alternating fashion.

18. Apparatus for determining the vertical and horizontal conductivities of formations surrounding a borehole, comprising:
a transmitter coil having an axis substantially perpendicular to the borehole axis;
a receiver coil spaced from said transmitter coil and having an axis which is also perpendicular to the borehole axis;
means for energizing said transmitter coil;
means for detecting the resistive and reactive components of signals induced in said receiver coil; and
means for combining said detected resistive and reactive components to determine the vertical and horizontal conductivities of said formations.

19. Apparatus as defined by claim 18 wherein said receiver coil has its axis oriented substantially parallel to said transmitter coil.

20. Apparatus as defined by claim 18 wherein said transmitter coil and receiver coil are mounted in a mechanically passive manner on a support member.

21. Apparatus as defined by claim 19 wherein said transmitter coil and receiver coil are mounted in a mechanically passive manner on a support member.

22. A method for determining the vertical conductivity of formations surrounding a borehole, comprising the steps of:

suspending spaced transmitter and receiver coils in the borehole, the coils having axes which are substantially parallel to each other and substantially perpendicular to the borehole axis;

energizing the transmitter coil;

detecting the resistive and reactive components of the signals induced in the receiver coil; and determining formation vertical conductivity from said detected resistive and reactive components.

23. The method as defined by claim 22 wherein said determining step comprises combining the detected resistive and reactive components.

24. A method for determining the vertical and horizontal conductivities of formations surrounding a borehole, comprising the steps of:

suspending spaced transmitter and receiver coils in a borehole, the transmitter and receiver coils having substantially parallel axes which are substantially perpendicular to the borehole axis;

energizing the transmitter coil;

detecting the resistive and reactive components of signals induced in the receiver coil; and combining the detected resistive and reactive components to determine the vertical and horizontal conductivities of said formations.

25. A method for determining the vertical conductivity of formations surrounding a borehole, comprising the steps of:

deriving, from spaced parallel transmitting and receiving coils positioned in the borehole with their axes substantially perpendicular to the borehole axis, the resistive and reactive components of the signals induced in the receiver coil as a result of energizing the transmitter coil; and determining formation vertical conductivity from the derived resistive and reactive components.

26. The method as defined by claim 25 wherein said determining step comprises combining the derived resistive and reactive components.

27. A method for determining the vertical and horizontal conductivities of formations surrounding a borehole, comprising the steps of:

deriving, from spaced parallel transmitting and receiving coils positioned in the borehole with their axes substantially perpendicular to the borehole axis, the resistive and reactive components of signals induced in the receiver coil as a result of energizing the transmitter coil; and combining said resistive and reactive components to determine the vertical and horizontal conductivities of said formations.

* * * * *